(12) United States Patent
Wang et al.

(10) Patent No.: US 11,916,248 B2
(45) Date of Patent: Feb. 27, 2024

(54) BATTERY, MANUFACTURING METHOD AND MANUFACTURING APPARATUS THEREOF, AND POWER CONSUMPTION DEVICE

(71) Applicant: CONTEMPORARY AMPEREX TECHNOLOGY CO., LIMITED, Fujian (CN)

(72) Inventors: Xuehui Wang, Fujian (CN); Xiongwei Gao, Fujian (CN)

(73) Assignee: CONTEMPORARY AMPEREX TECHNOLOGY CO., LIMITED, Fujian (CN)

(*) Notice: Subject to any disclaimer, the term of this patent is extended or adjusted under 35 U.S.C. 154(b) by 28 days.

(21) Appl. No.: 17/588,266

(22) Filed: Jan. 29, 2022

(65) Prior Publication Data
US 2022/0384902 A1  Dec. 1, 2022

Related U.S. Application Data

(63) Continuation of application No. PCT/CN2021/097228, filed on May 31, 2021.

(51) Int. Cl.
*H01M 50/317* (2021.01)
*H01M 10/44* (2006.01)
(Continued)

(52) U.S. Cl.
CPC ....... *H01M 50/317* (2021.01); *H01M 10/445* (2013.01); *H01M 50/107* (2021.01);
(Continued)

(58) Field of Classification Search
CPC ........... H01M 10/445; H01M 2200/00; H01M 2220/20; H01M 50/107; H01M 50/152;
(Continued)

(56) References Cited

U.S. PATENT DOCUMENTS

2021/0074982 A1   3/2021  Kim et al.
2021/0104801 A1*  4/2021  Chu .................... H01M 50/249

FOREIGN PATENT DOCUMENTS

CN    204155988 U   2/2015
CN    205810898 U  12/2016
(Continued)

OTHER PUBLICATIONS

Machine Translation CN111668409A (Year: 2020).*
International Search Report issued in related Application No. PCT/CN2021/097228.
Extended European Search Report issued in related Application No. EP21844607.8 dated Sep. 29, 2022; 8 pages.

*Primary Examiner* — Victoria H Lynch
(74) *Attorney, Agent, or Firm* — Calderon Safran & Cole P.C.

(57) ABSTRACT

Embodiments of the present disclosure provide a battery, a manufacturing method and a manufacturing apparatus thereof, and a power consumption device. The battery includes: at least one battery layer, wherein each battery layer includes a plurality of battery cells disposed side by side in a first direction, and each battery cell in the plurality of battery cells includes a case and an end cover which are connected to each other; and at least one limiting member disposed corresponding to the at least one battery layer and covering the case, so as to limit the corresponding battery layer to move in a third direction, wherein the third direction is perpendicular to the at least one battery layer, the at least one limiting member includes a first limiting member, the first limiting member is provided with a weakened region, and the weakened region is configured to enable the battery cell to release pressure through a region of the case corresponding to the weakened region when an internal pressure of the battery cell reaches a first threshold.

20 Claims, 6 Drawing Sheets

(51) Int. Cl.
*H01M 50/107* (2021.01)
*H01M 50/152* (2021.01)
*H01M 50/213* (2021.01)

(52) U.S. Cl.
CPC ....... *H01M 50/152* (2021.01); *H01M 50/213* (2021.01); *H01M 2200/00* (2013.01); *H01M 2220/20* (2013.01)

(58) Field of Classification Search
CPC ............ H01M 50/213; H01M 50/291; H01M 50/293; H01M 50/30; H01M 50/317; H01M 50/3425; Y02E 60/10
See application file for complete search history.

(56) References Cited

FOREIGN PATENT DOCUMENTS

| | | |
|---|---|---|
| CN | 207664185 U | 7/2018 |
| CN | 208298909 U | 12/2018 |
| CN | 111106277 A | 5/2020 |
| CN | 111106278 A | 5/2020 |
| CN | 210897365 U | 6/2020 |
| CN | 111668409 A | 9/2020 |
| CN | 112701393 A | 4/2021 |
| WO | 2019028516 A1 | 2/2019 |

\* cited by examiner

BATTERY, MANUFACTURING METHOD AND MANUFACTURING APPARATUS THEREOF, AND POWER CONSUMPTION DEVICE

CROSS-REFERENCE TO RELATED APPLICATION

This application is the United States national phase of International Application No. PCT/CN2021/097228 filed on May 31, 2021, the disclosures of which are hereby incorporated in their entirety by reference.

TECHNICAL FIELD

The present disclosure relates to the technical field of batteries, and in particular to a battery, a manufacturing method and a manufacturing apparatus thereof, and a power consumption device.

BACKGROUND

Lithium-ion batteries and other batteries are widely used in various devices due to their advantages such as high energy density, high power density, large number of cycle use, and long storage time.

In order to acquire greater electrical energy, a plurality of cylindrical battery cells are connected in parallel and/or in series to form the battery. In related art, in order to release pressure inside the battery cells in time during thermal runaway of the battery cells, a pressure release mechanism is disposed on an end cover of each battery cell, so as to discharge emissions in the battery cell through the pressure release mechanism during thermal runaway of the battery, thereby avoiding potentially more serious accidents. However, it is found in actual use that it is difficult for such a battery to achieve a better exhaust effect, and the safety needs to be improved.

SUMMARY

According to a first aspect of the present disclosure, there is provided a battery, including:
- at least one battery layer, wherein each battery layer in the at least one battery layer includes a plurality of battery cells disposed side by side in a first direction, and each battery cell in the plurality of battery cells includes a case and an end cover which are connected to each other; and
- at least one limiting member, disposed corresponding to the at least one battery layer and covering the case, so as to limit the corresponding battery layer to move in a third direction, wherein the third direction is perpendicular to the at least one battery layer, the at least one limiting member includes a first limiting member, the first limiting member is provided with a weakened region, and the weakened region is configured to enable the battery cell to release pressure through a region of the case corresponding to the weakened region when an internal pressure of the battery cell reaches a first threshold.

In the above solution, the weakened region is disposed on the first limiting member in the at least one limiting member, and the weakened region is configured to enable the battery cell to release pressure through the region of the case corresponding to the weakened region when the internal pressure of the battery cell reaches the first threshold. During thermal runaway of the battery, a limiting effect of the first limiting member for the case in the weakened region is reduced, and the emissions generated by pressure release can be discharged out of the battery cell through the region of the case corresponding to the weakened region. This manner of realizing the pressure release through the case of the battery cell is beneficial to increase the area of a pressure release region, ensure the stable and smooth discharge of the emissions in the battery cell, prevent instantaneous explosion and fire, and improve the safety of the battery during operation.

In some embodiments, the battery includes a plurality of battery layers stacked in the third direction, and the first limiting member is disposed between every two adjacent battery layers.

In the above solution, during thermal runaway of the battery, it can be ensured that the battery cells in each battery layer can release pressure through the region corresponding to the weakened region, thereby improving the operation safety of the battery.

In some embodiments, the weakened region is configured to form a channel for outward discharge of the emissions of the battery cell during pressure release of the battery cell.

In the above solution, the weakened region plays a role of reducing the limiting effect on the case, so that the battery cell can release pressure at a position on the case corresponding to the weakened region, and the weakened region can also discharge the emissions out of the battery in time after pressure release of the battery cell, which is favorable to quickly release the pressure and heat inside the battery cell and improve operation reliability of the battery.

In some embodiments, the at least one limiting member is the first limiting member, and each first limiting member is provided with the weakened region at a position of each battery cell in the corresponding battery layer.

In the above solution, during thermal runaway of any battery cell, the pressure can be released through the region of the case corresponding to the weakened region, thereby improving the operation safety of the battery.

In some embodiments, the first limiting member is provided with a plurality of weakened regions at intervals in the first direction.

In the above solution, there are more battery cells in the same battery layer that can release pressure through the region corresponding to the weakened region.

In some embodiments, the weakened region covers at least two adjacent battery cells in the first direction.

In the above solution, when a size of the battery cell, for example, a cylindrical battery, in the first direction is smaller, at least two adjacent battery cells are enabled to share one weakened region, which can reduce processing difficulty and is also favorable to increase a pressure release area of the case during thermal runaway of the battery cell. Moreover, for the embodiment where the weakened region penetrates the first limiting member in a thickness direction during pressure release, at least two adjacent battery cells share one channel for outward discharge of the emissions, which can realize rapid discharge.

In some embodiments, in a second direction, a size of the weakened region is less than a size of the case, and the second direction is perpendicular to a plane defined by the first direction and the third direction.

In the above solution, a stable pressing force is provided to the battery cell in a region outside the weakened region while the battery cell is allowed to release pressure in the region corresponding to the weakened region, so that the battery cell achieves stable pressure release.

In some embodiments, in the second direction, the weakened region is disposed in a middle region of the case.

In the above solution, on one hand, the structure enables two ends of the limiting member in the second direction to reliably press the case, so that the battery cell can release the pressure in the middle region of the case, and the stability of pressure release is improved. On the other hand, in the second direction, the middle region of the case is subjected to a smaller binding force of the end cover and is more easily deformed. Therefore, the weakened region is disposed corresponding to the middle region of the case in the second direction, so that the region on the case corresponding to the weakened region is easier to blast for pressure release.

In some embodiments, a projection of the weakened region in a reference plane perpendicular to the third direction is rectangular.

In the above solution, the structure is beneficial to increase an area of the weakened region to increase the area of the pressure release region, thereby ensuring stable and smooth discharge of the emissions inside the battery cell, preventing instantaneous explosion and fire, and improving the safety of the battery during operation.

In some embodiments, the weakened region includes at least one of a through hole and a thickness-reduced portion.

In the above solution, when including the through hole, the weakened region is easy to process. Besides, during thermal runaway of the battery, the first limiting member does not limit the case of the battery cell in a region of the through hole, the region on the case corresponding to the through hole is a strength-reduced region, and when the internal pressure of the battery cell reaches the first threshold, the region on the case corresponding to the through hole is blasted, so that the emissions of the battery cell are discharged out of the battery cell stably and smoothly, and the safety of the battery during operation is improved.

In the above solution, when the weakened region includes the thickness-reduced portion, a pressure-release pressure of the battery cell can be controlled by designing a thickness of the weakened region, so that the proper pressure-release pressure can be set for the battery cell according to an operation environment and safety requirements of the battery. The first limiting member has a small binding force on the case of the battery cell in a region of the thickness-reduced portion. Therefore, the region is a blasting-prone region. When the internal pressure of the battery cell reaches the first threshold, the region on the case corresponding to the thickness-reduced portion is blasted, so that the emissions of the battery cell are discharged out of the battery cell stably and smoothly, and the safety of the battery during operation is improved.

In some embodiments, there is a gap between adjacent battery cells in the same battery layer, and the gap is in communication with the weakened region.

In the above solution, the gap forms a channel for outward discharge of the emissions generated during pressure release of the battery cell, so as to achieve a rapid pressure drop and reduce the risk of a chain reaction between adjacent battery cells during thermal runaway.

In some embodiments, the battery cell is provided with a pressure release mechanism, and the pressure release mechanism is configured to perform pressure release when the internal pressure of the battery cell reaches the first threshold.

In the above solution, by disposing the pressure release mechanism on the battery cell, in the case where the pressure release mechanism is disposed on the end cover or in a region on the case outside the weakened region, when the internal pressure of the battery cell reaches the first threshold, pressure release can be performed through the pressure release mechanism and the region on the case corresponding to the weakened region simultaneously, which can increase the total area of a pressure release channel and increase a pressure release speed. When the pressure release mechanism is disposed in the region on the case corresponding to the weakened region, the region on the case corresponding to the weakened region can be broken through more controllably when the internal pressure of the battery cell reaches the first threshold, thereby improving the reliability of pressure release.

In some embodiments, the area of the weakened region is greater than an area of the pressure release mechanism.

In the above solution, during thermal runaway of the battery cell, a main pressure release function can be achieved through the region on the case corresponding to the weakened region, and the pressure release mechanism can play an auxiliary pressure release function.

In some embodiments, the pressure release mechanism is disposed on the case, and the pressure release mechanism is disposed corresponding to the weakened region.

In the above solution, when the internal pressure of the battery cell reaches the first threshold, the region on the case corresponding to the weakened region can be more easily broken through for pressure release, and the pressure-release pressure is more controllable, thereby improving the reliability of pressure release.

In some embodiments, the at least one limiting member is made of a metal material.

In the above solution, the at least one limiting member is made of the metal material, which can increase rigidity of the limiting member, and provide a reliable pressing force for the case of the battery cell, so that stable pressure release can be achieved through the region on the case corresponding to the weakened region during thermal runaway of the battery cell.

In some embodiments, an insulating film is disposed between each of the at least one limiting member and the adjacent battery cell to insulate the limiting member from the battery cell.

In the above solution, the insulating film is disposed between each of the at least one limiting member and the adjacent battery cell, which can ensure the insulativity between the limiting member and the battery cell, prevent the battery cell from being short-circuited, and improve the operation reliability of the battery.

In some embodiments, the battery cell has a cylindrical shape, each of the at least one limiting member is provided with a recessed portion, and the recessed portion is configured to accommodate the battery cell to limit the movement of the battery cell in the first direction and the third direction.

In the above solution, by disposing the recessed portion on the limiting member, the movement of the battery cell in the first direction and the third direction can be limited more reliably, so as to prevent the battery cell from shifting due to vibration during operation. Besides, it is convenient to maintain the gap L between adjacent battery cells in the same battery layer during assembling.

According to a second aspect of the present disclosure, there is provided a power consumption device, including the battery described in the above embodiment, wherein the battery is used to provide electrical energy for the power consumption device.

In the above solution, by adopting the battery that can achieve stable exhaust during thermal runaway in the power consumption device, the battery can be prevented from explosion and fire, thereby improving the operation reliability and safety of the power consumption device.

According to a third aspect of the present disclosure, there is provided a battery manufacturing method, which includes:

forming at least one battery layer by assembling, wherein each battery layer in the at least one battery layer includes a plurality of battery cells disposed side by side in a first direction, and each battery cell in the plurality of battery cells includes a case and an end cover which are connected to each other;

providing at least one limiting member, wherein the at least one limiting member includes a first limiting member, the first limiting member is provided with a weakened region, and the weakened region is configured to enable the battery cell to release pressure through a region of the case corresponding to the weakened region when an internal pressure of the battery cell reaches a first threshold; and disposing the at least one limiting member corresponding to the at least one battery layer and covering the case, so as to limit the corresponding battery layer to move in a third direction perpendicular to the first direction, wherein the third direction is perpendicular to the at least one battery layer.

In the above solution, during thermal runaway of the battery produced by the manufacturing method, the limiting effect of the first limiting member on the case in the weakened region is reduced compared with other regions, the region of the case corresponding to the weakened region is blasted for pressure release at first, and the emissions generated by the pressure release can be discharged out of the battery cell through the region of the case corresponding to the weakened region. This manner of realizing the pressure release through the case of the battery cell is beneficial to increase the area of a pressure release region, ensure the stable and smooth discharge of the emissions in the battery cell, prevent instantaneous explosion and fire, and improve the safety of the battery during operation.

According to a fourth aspect of the present disclosure, there is provided a battery manufacturing apparatus, which includes:

a battery layer assembling device configured to form at least one battery layer by assembling, wherein each battery layer in the at least one battery layer includes a plurality of battery cells disposed side by side in a first direction, and each battery cell in the plurality of battery cells includes a case and an end cover which are connected to each other;

a limiting member supply device configured to supply at least one limiting member, wherein the at least one limiting member includes a first limiting member, and the first limiting member is provided with a weakened region, which enables the battery cell to release pressure through a region of the case corresponding to the weakened region when an internal pressure of the battery cell reaches a first threshold; and a battery assembling device configured to dispose the at least one limiting member corresponding to the at least one battery layer and covering the case, so as to limit the corresponding battery layer to move in a third direction perpendicular to the first direction, wherein the third direction is perpendicular to the at least one battery layer.

BRIEF DESCRIPTION OF THE DRAWINGS

In order to describe the technical solutions in the embodiments of the present disclosure more clearly, the following briefly introduces the accompanying drawings required to be used in the embodiments of the present disclosure. Apparently, the accompanying drawings in the following description show merely some embodiments of the present disclosure, and a person of ordinary skill in the art may still derive other drawings from these accompanying drawings without creative efforts.

In the drawings, the drawings are not drawn to actual scale.

Reference signs 100, vehicle; 101, axle; 102, wheel; 103, motor; 104, controller;

200, battery manufacturing apparatus; 210, battery layer assembling device; 220, limiting member supply device; 230, battery assembling device;

10, battery; 10A, box body; 10', battery layer; 1, battery cell; 11, case; 111, pressure release mechanism; 12, end cover; 121, electrode terminal; 122, liquid injection hole; 2, limiting member; 2', first limiting member; 21, weakened region; 21', through hole; 22, recessed portion; 3, insulating film.

DETAILED DESCRIPTION

The following describes implementations of the present disclosure in further detail with reference to the drawings and the embodiments. The detailed description of the following embodiments and the drawings are used to exemplarily illustrate the principle of the present disclosure rather than limiting the scope of the present disclosure, that is, the present disclosure is not limited to the described embodiments.

In the descriptions of the present disclosure, it should be noted that unless otherwise stated, the term "plurality" means two or more; the orientation or positional relationships indicated by the terms "upper", "lower", "left", "right", "inner", "outer", etc., are only for conveniently describing the present disclosure and simplifying the descriptions, rather than indicating or implying that the specified apparatus or element has to be specifically located, and structured and operated in a specific direction, and therefore, should not be understood as limitations to the present disclosure. Moreover, the terms "first", "second" "third", etc., are only for the purpose of description and should not be construed as indicating or implying relative importance. "Perpendicular" is not strictly perpendicular, but within the allowable range of error. "Parallel" is not strictly parallel, but within the allowable range of error.

The orientation words appearing in the following descriptions are all directions shown in the figures without limiting specific structures of the present disclosure. In the descriptions of the present disclosure, unless otherwise clearly specified and limited, it should be also noted that the terms "installed", "connected with each other" and "connected to" need to be broadly understood, for example, connection may be fixed connection, detachable connection or integrated connection; or may be direct connection, or indirect connection via an intermediation. Those of ordinary skill in the art can understand the specific meaning of the above terms in accordance with specific conditions.

In order to clearly describe each orientation in the following embodiments, each direction is defined below. By taking the coordinate system of FIG. 2 as an example, the first direction x is an arrangement direction of a plurality of battery cells 1 in each battery layer 10', and the second direction y is perpendicular to the first direction x in a plane of the battery layer 10'; and the third direction z is perpendicular to the battery layer 10', that is, the third direction z is perpendicular to the first direction x and the second direction y.

Based on such orientation definition, the descriptions of the orientation or positional relationships indicated by the terms "upper", "lower", "top", "bottom", "front", "back", "inner", "outer", etc., are adopted only for conveniently describing the present disclosure, rather than indicating or implying that the specified apparatus has to be specifically located, and structured and operated in a specific direction, and therefore, should not be understood as limitations to the present disclosure.

As part of an inventive creating process of the present disclosure, inventors, after countless experiments and verifications, found that one of the reasons for lower safety of the battery is: during thermal runaway of the battery cell, due to the smaller area of an end cover of the battery cell, a pressure release mechanism disposed on the end cover has a small opening; after thermal runaway of the battery, an exhaust channel is small; and since the exhaust channel is small, the exhaust is not in time, and the battery cell is easy to explode and catch fire.

The pressure release mechanism refers to an element or component that is activated to release an internal pressure or temperature when the internal pressure or temperature of the battery cell reaches a predetermined threshold. The threshold design varies according to different design requirements. The threshold may depend on the material of one or more of a positive electrode piece, a negative electrode piece, electrolyte and a separation film in the battery cell. The pressure release mechanism may be in the form of an explosion-proof valve, a gas valve, a pressure release valve or a safety valve, etc., and may specifically adopt a pressure-sensitive or temperature-sensitive element or structure. That is, when the internal pressure or temperature of the battery cell reaches the predetermined threshold, the pressure release mechanism executes an action or a weakened structure disposed in the pressure release mechanism is destroyed, thereby forming an opening or channel for releasing the internal pressure or temperature.

The "actuated" mentioned in the present disclosure means that the pressure release mechanism generates an action or is activated to a certain state, so that the internal pressure and temperature of the battery cell can be released. The action generated by the pressure release mechanism may include but not limited to that at least a part in the pressure release mechanism is ruptured, broken, torn, or opened, and so on. When the pressure release mechanism is activated, internal emissions of the battery cell will be discharged outward from an activated part. In this way, the pressure and temperature of the battery cell can be released in the case of controlling the pressure or temperature, thereby avoiding potentially more serious accidents.

The emissions from the battery cell mentioned here include but not limited to: electrolyte, dissolved or split positive and negative electrode pieces, fragments of the separation film, high temperature and high pressure gas generated by reaction (combustible gases of CH4, CO and the like), flames, etc.

In view of this, the present disclosure intends to change an exhaust mode of the battery during thermal runaway, and the main object is to improve the smoothness of exhaust, so that gases inside the battery cell can be discharged stably.

An object of the present disclosure is to improve the safety of a battery during operation.

In the above solution, during thermal runaway of the battery produced by the manufacturing apparatus, the limiting effect of the first limiting member on the case in the weakened region is reduced compared with other regions, the region of the case corresponding to the weakened region is blasted for pressure release at first, and the emissions generated by the pressure release can be discharged out of the battery cell through the region of the case corresponding to the weakened region. This manner of realizing the pressure release through the case of the battery cell is beneficial to increase the area of a pressure release region, ensure the stable and smooth discharge of the emissions in the battery cell, prevent instantaneous explosion and fire, and improve the safety of the battery during operation.

A power consumption device may adopt such a battery, and the battery is configured to provide electrical energy to the power consumption device. The power consumption device may be a mobile phone, a portable device, a notebook computer, a battery car, an electric car, a ship, a spacecraft, an electric toy, an electric tool, etc. For example, the spacecraft includes an airplane, a rocket, a space shuttle, a spaceship, etc. The electric toy includes a fixed or mobile electric toy, such as a game console, an electric car toy, an electric ship toy and an electric airplane toy. The electric tool includes a metal cutting electric tool, a grinding electric tool, an assembling electric tool, and a railway electric tool, such as an electric drill, an electric grinder, an electric wrench, an electric screwdriver, an electric hammer, an impact drill, a concrete vibrator and an electric planer.

Figure 1:
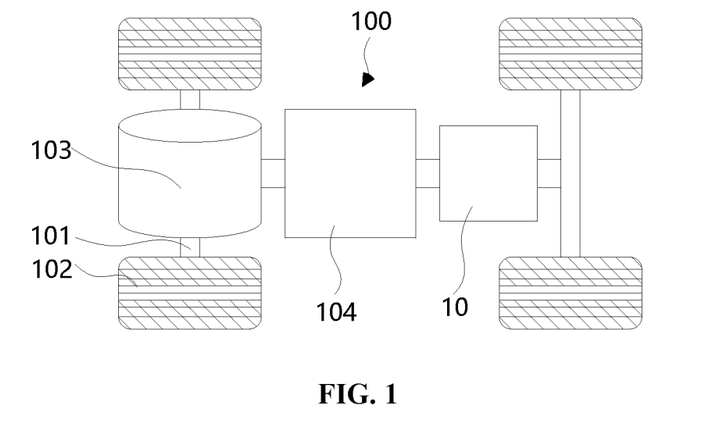
FIG. 1 is a schematic structural diagram of some embodiments of installing a battery on a vehicle with the present disclosure.

As shown in FIG. 1, the power consumption device may be a vehicle 100, such as a new energy vehicle. The new energy vehicle may be a pure electric vehicle, a hybrid vehicle, or an extended-range vehicle, etc.; or the battery-using apparatus may also be an unmanned aircraft or ship, etc. The vehicle 100 includes a battery 10, which is used to provide electrical energy for operation of the vehicle. The battery 10 that can achieve stable exhaust during thermal runaway can prevent explosion and fire, and can improve the operation reliability and safety of the power consumption device.

The vehicle 100 further includes an axle 101, wheels 102 connected to the axle 101, a motor 103, a controller 104, and the battery 10. The motor 103 is used to drive the axle 101 to rotate, and the controller 104 is used to control operation of the motor 103. The battery 10 is used to provide electrical energy for the operation of the motor 103 and other components in the vehicle.

Figure 11:
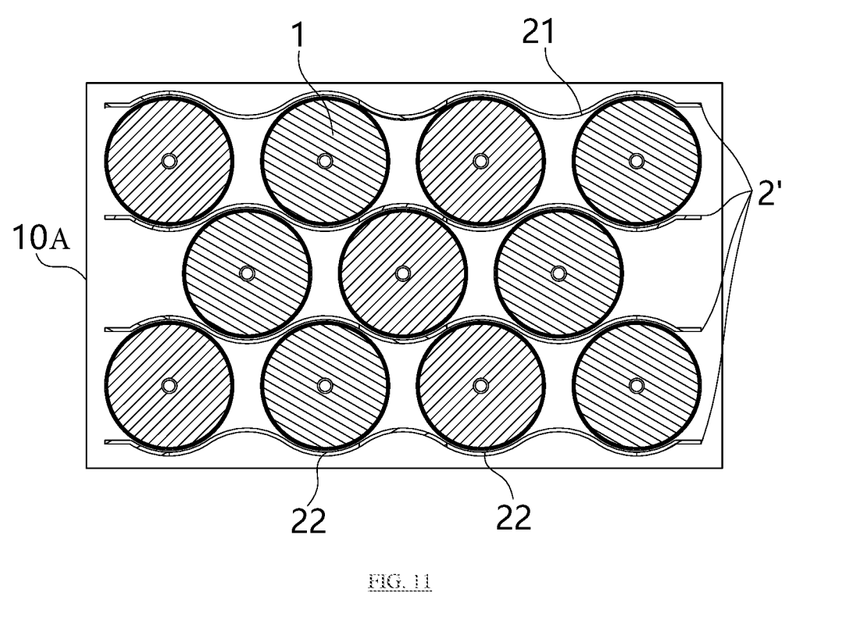
FIG. 11 is a schematic diagram of a battery in some embodiments of a battery according to the present disclosure.

As shown in FIG. 11, the battery may include a box body 10A and a battery cell. The interior of the box body 10A is of a hollow structure, and the battery cell is accommodated in the box body 10A. The box body 10A is used to provide an accommodation space for the battery cell. In some embodiments, the box body 10A may include a first part and a second part, and the first part and the second part cover each other to define the accommodation space for accommodating the battery cell. Of course, the connection between the first part and the second part may be sealed by a sealing member (not shown in the figure), and the sealing member may be a sealing ring, sealant, etc.

In the battery, there may be one or more battery cells. If there are a plurality of battery cells, the plurality of battery cells may be connected in series, in parallel, or in hybrid. The hybrid connection means that the plurality of battery cells are connected both in series and in parallel. The plurality of battery cells may be directly connected in series or in parallel or in hybrid together, and then the whole formed by the plurality of battery cells is accommodated in the box body 10A. Of course, the plurality of battery cells may also be connected in series or parallel or hybrid to form a battery module at first, and a plurality of battery modules are connected in series or in parallel or in hybrid to form a whole and are accommodated in the box body 10A. The battery cell may be a secondary battery in the shape of a cylinder, a square, or other shapes.

The battery cell may include a case, an electrode assembly, and an end cover. The case has an opening, the electrode assembly is accommodated in the case, and the end cover is used to close the opening of the case. The electrode assembly may include a positive electrode piece, a negative electrode piece (not shown in the figure), and a separation film (not shown in the figure). The electrode assembly may be a wound structure formed by winding the positive electrode piece, the separation film, and the negative electrode piece, or a laminated structure formed by laminating the positive electrode piece, the separation film, and the negative electrode piece. The electrode assembly also includes a positive electrode tab and a negative electrode tab. The positive electrode tab may be a positive electrode current collector not coated with a positive electrode active material layer in the positive electrode piece, and the negative electrode tab may be a negative electrode current collector not coated with a negative electrode active material layer in the negative electrode piece.

Figure 2:
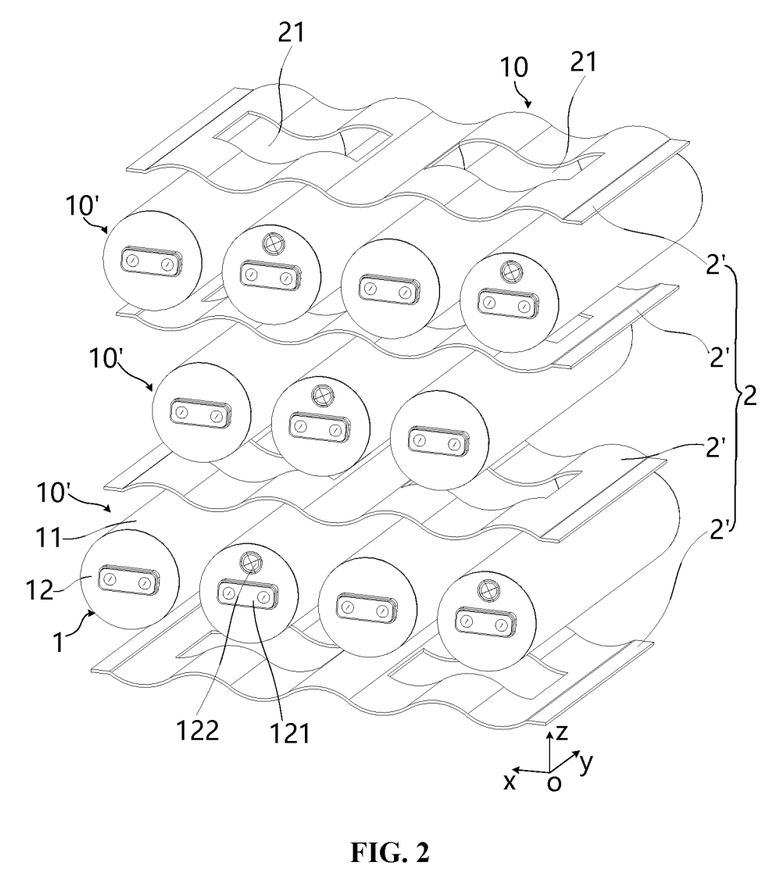
FIG. 2 is a schematic diagram of a battery internal structure in some embodiments of a battery according to the present disclosure.

In some embodiments, as shown in FIG. 2, the battery 10 includes: at least one battery layer 10' and at least one limiting member 2.

One battery layer 10' may be disposed in the battery 10, or a plurality of battery layers 10' may be stacked in the third direction z, and the third direction z is perpendicular to at least one battery layer 10'. Each battery layer 10' in the at least one battery layer 10' includes a plurality of battery cells 1 disposed side by side in the first direction x, and each battery cell 1 in the plurality of battery cells 1 includes a case 11 and an end cover 12 which are connected to each other.

The following embodiment takes a cylindrical battery cell 1 as an example for illustration. The axis of each battery cell 1 is consistent with the second direction y, and the second direction y is perpendicular to the first direction x in a plane of the battery layer 10'.

The at least one limiting member 2 is disposed corresponding to the at least one battery layer 10' and covering the case 11, so as to limit the corresponding battery layer 10' to move in the third direction z, which is perpendicular to the at least one battery layer 10'.

The at least one limiting member 2 includes a first limiting member 2', a weakened region 21 is disposed on the first limiting member 2', and the weakened region 21 is configured to enable the battery cell 1 to release pressure through a region of the case 11 corresponding to the weakened region 21 when the internal pressure of the battery cell 1 reaches a first threshold. After pressure release, the emissions in the battery cell 1 are discharged out of the case 11.

According to the battery 10 of the present embodiment, the weakened region 21 is disposed on the first limiting member 2' in the at least one limiting member 2, and the weakened region 21 is configured to enable the battery cell 1 to release pressure through the region of the case 1 corresponding to the weakened region 21 when the internal pressure of the battery cell 1 reaches the first threshold. During thermal runaway of the battery 10, a limiting effect of the first limiting member 2' for the case 11 in the weakened region 21 is reduced compared with other regions, the region of the case 11 corresponding to the weakened region 21 is blasted for pressure release at first, and the emissions generated by the pressure release can be discharged out of the battery cell 1 through the region of the case 11 corresponding to the weakened region 21. This manner of realizing the pressure release through the case 11 of the battery cell 1 is beneficial to increase the area of a pressure release region, ensure the stable and smooth discharge of the emissions in the battery cell 1, prevent instantaneous explosion and fire, and improve the safety of the battery 10 during operation.

For example, for a cylindrical battery cell 1, due to the small area of the end cover 12, a pressure release mechanism disposed on the end cover 12 has a small opening. After thermal runaway of the battery, an exhaust channel is small. Since the exhaust channel is small, the exhaust is not in time, and the battery cell 1 is easy to explode and catch fire. According to the embodiment of the present disclosure, a pressure release position during thermal runaway can be set on the case 11, and the case 11 has a larger area, which is beneficial to increase the area of the pressure release region, ensure the stable and smooth discharge of the emissions in the battery cell 1, prevent instantaneous explosion and fire, and improve the safety of the battery 10 during operation. Therefore, the battery 10 according to the present disclosure is very suitable for the battery cell 1 with a small volume, and the pressure release mechanism on the end cover 12 can be canceled.

The limiting member 2 may be a limiting plate or a limiting block, etc. The shape and area of the weakened region 21 may be determined according to a thermal runaway test of the single battery cell 1.

In some embodiments, the limiting member 2 is disposed on the side of the battery layer 10' in the third direction z, and may be located on one side or both sides of the battery layer 10'. The limiting members 2 adjacent to a certain battery layer 10' are the limiting members 2 corresponding to the battery layer 10'. The limiting member 2 and the case 11 may be in direct contact or an adhesive layer may be disposed between the two.

The weakened region 21 in the present embodiment may be in one or a combination of the following forms, but not limited thereto.

Figure 3:
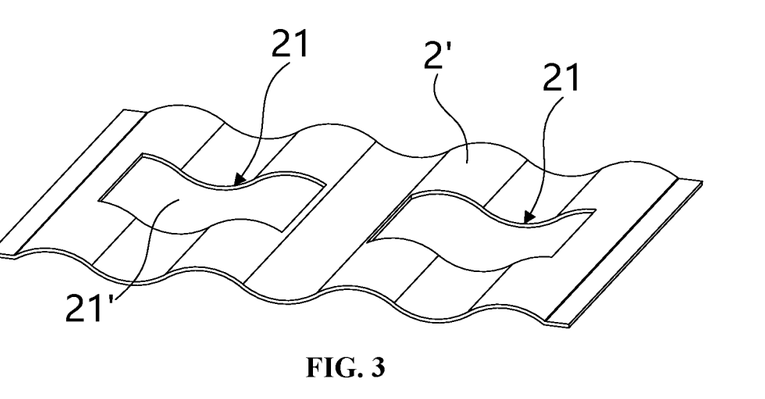
FIG. 3 is a schematic structural diagram of a first limiting member in some embodiments of the battery according to the present disclosure.

In a structural form, as shown in FIG. 3, the weakened region 21 includes a through hole 21'. By disposing the through hole 21', the weakened region 21 is formed and is easy to process. Besides, during thermal runaway of the battery 10, the first limiting member 2' does not limit the case 11 of the battery cell 1 in a region of the through hole 21', the region on the case 11 corresponding to the through hole 21' is a strength-reduced region, and when the internal pressure of the battery cell 1 reaches the first threshold, the region on the case 11 corresponding to the through hole 21' is blasted, so that the emissions of the battery cell 1 are discharged out of the battery cell 1 stably and smoothly, and the safety of the battery 10 during operation is improved.

In another structural form, the weakened region 21 includes a thickness-reduced portion (not shown in the figure). The weakened region 21 is formed by reducing a local thickness of the first limiting member 2'. A pressure-release pressure of the battery cell 11 may be controlled by designing a thickness of the weakened region 21, so that the proper pressure-release pressure can be set for the battery cell 1 according to an operation environment and safety requirements of the battery 10. The first limiting member 2' has a small binding force on the case 11 of the battery cell 1 in a region of the thickness-reduced portion. Therefore, the region is a blasting-prone region. When the internal pressure of the battery cell 1 reaches the first threshold, the region on the case 11 corresponding to the thickness-reduced portion is blasted, so that the emissions of the battery cell 1 are discharged out of the battery cell 1 stably and smoothly, and the safety of the battery 10 during operation is improved.

In some embodiments, as shown in FIG. 2, during pressure release of the battery cell 1, the weakened region 21 is configured to form a channel for outward discharge of the emissions of the battery cell 1 during pressure release of the battery cell 1. The outward discharge here means that the emissions of the battery cell 1 penetrate the weakened region 21, are discharged to an opposite side of the first limiting member 2', flow toward the outermost first limiting member 2', and are finally discharged out of the battery 10.

For example, when the weakened region 21 is the through hole 21', the through hole 21' may directly form a channel for outward discharge of the emissions during pressure release of the battery cell 1. When the weakened region 21 is the thickness-reduced portion, the thickness-reduced portion is destroyed during pressure release of the battery cell 1, and penetrates the first limiting member 2' in a thickness direction to form the channel for outward discharge of the emissions.

In the present embodiment, the weakened region 21 plays a role of reducing the limiting effect on the case 11, so that the battery cell 1 can release pressure at a position on the case 11 corresponding to the weakened region 21, and the weakened region can also discharge the emissions out of the battery 10 in time after pressure release of the battery cell 1, which is favorable to quickly release the pressure and heat inside the battery cell 1 and improve operation reliability of the battery 10.

In some embodiments, as shown in FIG. 2, the battery 10 includes a plurality of battery layers 10' stacked in the third direction z, and the first limiting member 2' is disposed between every two adjacent battery layers 10'.

According to the present embodiment, it can be ensured that the battery cell 1 in each battery layer 10' can release pressure through the region corresponding to the weakened region 21 during thermal runaway, thereby improving the operation safety of the battery 10.

On this basis, an outer side surface of the outer battery layer 10' is also covered by the first limiting member 2', which is equivalent to that two first limiting members 2' are correspondingly disposed on the outer battery layer 10'. The battery cell 1 in the outer battery layer 10' may release pressure through a larger area on the case 11, thereby optimizing a pressure release effect.

In some embodiments, as shown in FIG. 2, each of the at least one limiting member 2 is the first limiting member 2', and each first limiting member 2' is provided with the weakened region 21 at the position of each battery cell 1 in the corresponding battery layer 10'.

According to the present embodiment, any battery cell 1 can release pressure through the region of the case 11 corresponding to the weakened region 21 during thermal runaway, thereby improving the operation safety of the battery 10.

In some embodiments, the at least one limiting member 2 includes a plurality of limiting members 2, and the plurality of limiting members 2 include the first limiting member 2' and a second limiting member (not shown in the figure). No weakened region 21 is disposed on the second limiting member. By disposing the weakened region 21 on part of the limiting members 2, the pressure release effect of part of the battery cells 1 can also be optimized, thereby improving the operation safety of the battery 10.

In some embodiments, as shown in FIG. 2, a plurality of weakened regions 21 are disposed on the first limiting member 2' at intervals in the first direction x. Such a structure enables more battery cells 1 in the same battery layer 10' to release pressure through the regions corresponding to the weakened regions 21. For example, the plurality of weakened regions 21 and the plurality of battery cells 1 in the battery layer 10' may be disposed in one-to-one correspondence, or the plurality of battery cells 1 may correspond to the same weakened region 21.

In some embodiments, the first limiting member 2' may also be provided with only one weakened region 21, and the weakened region 21 may only cover part of the battery cells 1, or cover all the battery cells 1 in the battery layer 10'.

In some embodiments, the weakened region 21 covers at least two adjacent battery cells 1 in the first direction x, for example, the weakened region 21 covers two adjacent, three or more battery cells 1. When the size of the battery cell 1, for example, a cylindrical battery, in the first direction x is smaller, at least two adjacent battery cells 1 are enabled to share one weakened region 21, which can reduce processing difficulty and is also favorable to increase a pressure release area of the case 11 during thermal runaway of the battery cell 1. Moreover, for the embodiment where the weakened region 21 penetrates the first limiting member 2' in the thickness direction during pressure release, at least two adjacent battery cells 1 share one channel for outward discharge of the emissions, which can realize rapid discharge.

Figure 4:
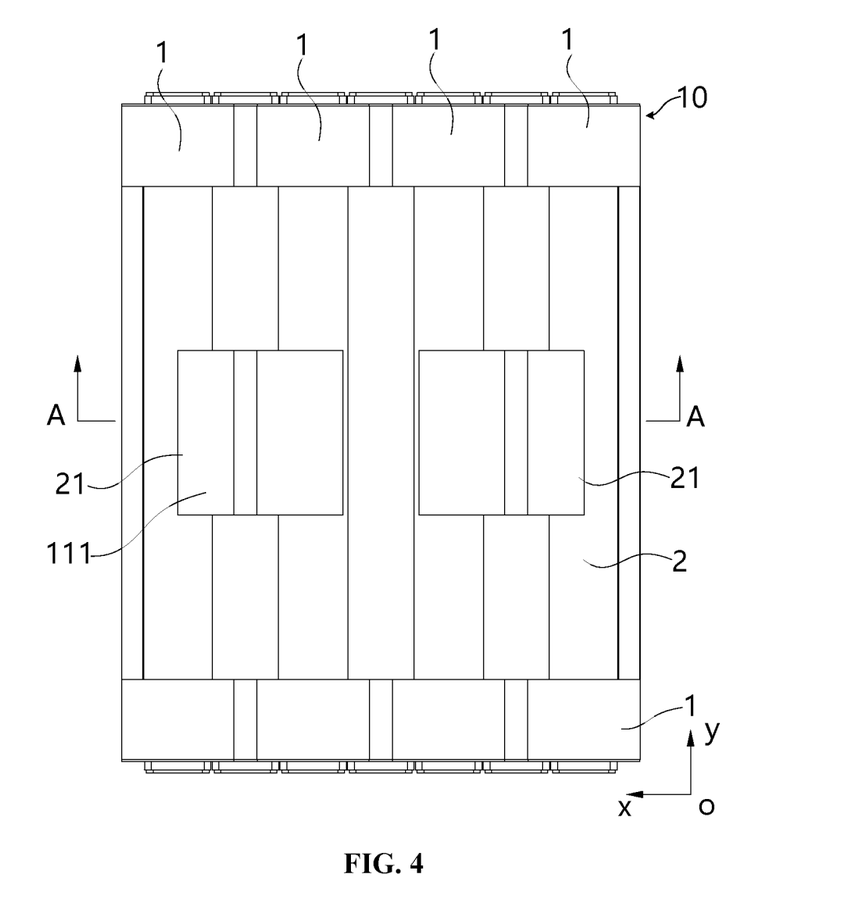
FIG. 4 is a top view of the battery internal structure in some embodiments of the battery according to the present disclosure.

In some embodiments, as shown in FIGS. 2 to 4, in the second direction y, the size of the weakened region 21 is less than the size of the case 11, wherein the second direction y is perpendicular to a plane defined by the first direction x and the third direction z. A stable pressing force is provided to the battery cell 1 in a region outside the weakened region 21 while such a structure allows the battery cell 1 to release pressure in the region corresponding to the weakened region 21, so that the battery cell 1 achieves stable pressure release.

In some embodiments, in the second direction y, the weakened region 21 is disposed in a middle region of the case 11. On one hand, the structure enables two ends of the limiting member 2 in the second direction y to reliably press the case 11, so that the battery cell 1 can release the pressure in the middle region of the case 11, and the stability of pressure release is improved. On the other hand, in the second direction y, the middle region of the case 11 is subjected to a smaller binding force of the end cover 12 and is more easily deformed. Therefore, the weakened region 21 is disposed corresponding to the middle region of the case 11 in the second direction y, so that the region on the case 11 corresponding to the weakened region 21 is easier to blast for pressure release.

In some embodiments, as shown in FIGS. 2 to 4, a projection of the weakened region 21 in a reference plane perpendicular to the third direction z is rectangular. Such a structure is favorable to increase the area of the weakened region 21 to increase the area of the pressure release region, ensure the stable and smooth discharge of the emissions inside the battery cell 1, prevent instantaneous explosion and fire, and improve the safety of the battery 10 during operation. In some embodiments, the projection of the weakened region 21 may also be a circle, an ellipse, a triangle, or other polygons.

Figure 5:
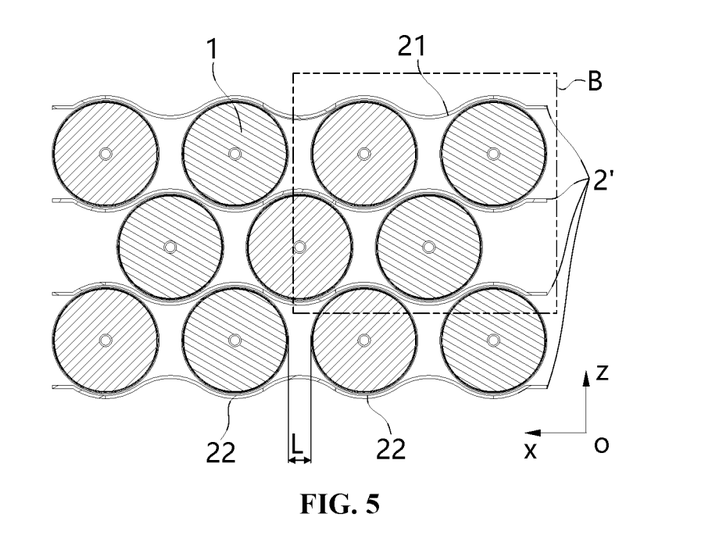
FIG. 5 is a cross-sectional view of A-A of FIG. 4.

In some embodiments, as shown in FIGS. 4 and 5, there is a gap L between adjacent battery cells 1 in the same battery layer 10', and the gap L is in communication with the weakened region 21. For example, when the weakened region 21 is the through hole 21', the gap L is in communication with the through hole 21' to form an integral channel, so that the emissions generated by the thermal runaway of the battery cell 1 can flow freely in the channel after breaking through the case 11, to be quickly discharged out of the battery 10. When the weakened region 21 is the thickness-reduced portion, the emissions generated by the thermal runaway can reach the position of the weakened region 21 through the gap L after breaking through the case 11. Further, the emissions can break through the thickness-reduced portion to be quickly discharged out of the battery 10.

The gap L in the present embodiment forms a channel for outward discharge of the emissions generated during pressure release of the battery cell 1, so as to achieve a rapid pressure drop and reduce the risk of a chain reaction between adjacent battery cells 1 during thermal runaway.

In some embodiments, the at least one limiting member 2 is made of a metal material, for example, an aluminum limiting member is adopted, to improve rigidity of the limiting member 2, and provide a reliable pressing force for the case 11 of the battery cell 1, so that stable pressure release can be achieved through the region on the case 11 corresponding to the weakened region 21 during thermal runaway of the battery cell 1.

Figure 6:
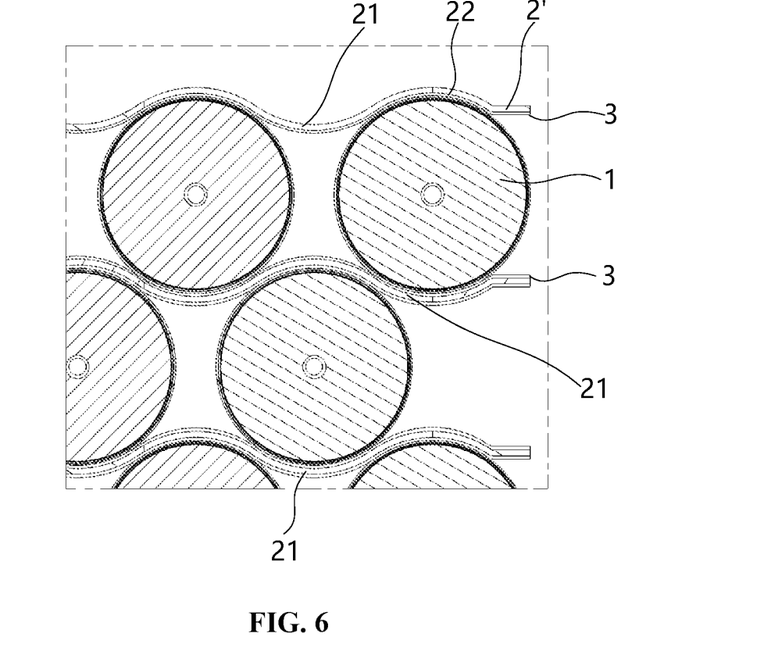
FIG. 6 is an enlarged view of position B of FIG. 5.

As shown in FIG. 6, an insulating film 3 is disposed between each limiting member 2 in the at least one limiting member 2 and the adjacent battery cell 1, so that the limiting member 2 is insulated from the battery cell 1. For example, the insulating film 3 can adopt a hot press film or the like. This structure can ensure insulativity between the limiting member 2 and the battery cell 1, prevent the battery cell 1 from being short-circuited, and improve the operation reliability of the battery 10.

In some embodiments, as shown in FIGS. 5 and 6, the battery cell 1 is cylindrical, and the axis of the battery cell 1 is consistent with the second direction y. Each limiting member 2 in the at least one limiting member 2 is provided with a recessed portion 22, and the recessed portion 22 is configured to accommodate the battery cell 1 to limit the movement of the battery cell 1 in the first direction x and the third direction z. If the battery layer 10' includes a plurality of battery cells 1, a plurality of recessed portions 22 are disposed on the limiting member 2 adjacent to the battery layer 10' at intervals in the first direction x. The plurality of recessed portions 22 and the plurality of battery cells are disposed in one-to-one correspondence.

The limiting member 2 may be disposed as a wave-shaped plate by stamping or bending; or the recessed portion 22 is formed by processing on the side surface of the limiting member 2 in the third direction z.

In some embodiments, the movement of the battery cell 1 in the second direction y in the present embodiment may be achieved by additionally disposing a limiting structure at the end part of the battery cell 1, or the movement of the battery cell 1 in the second direction y may be limited by an adhesive layer between the limiting member 2 and the battery cell 1 or a pressing force of the limiting member 2 for the battery cell 1.

In the present embodiment, by disposing the recessed portion 22 on the limiting member 2, the movement of the battery cell 1 in the first direction x and the third direction z can be limited more reliably, so as to prevent the battery cell 1 from shifting due to vibration during operation. Besides, it is convenient to maintain the gap L between adjacent battery cells 1 in the same battery layer 10' during assembling.

Figure 7:
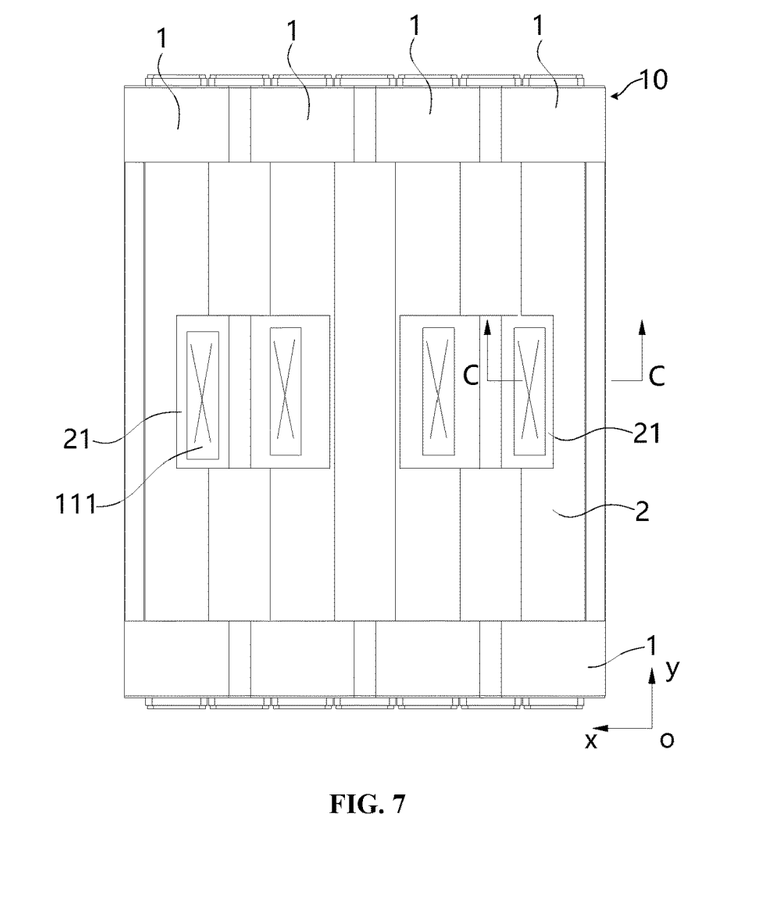
FIG. 7 is a top view of a battery internal structure in other embodiments of the battery according to the present disclosure.
Figure 8:
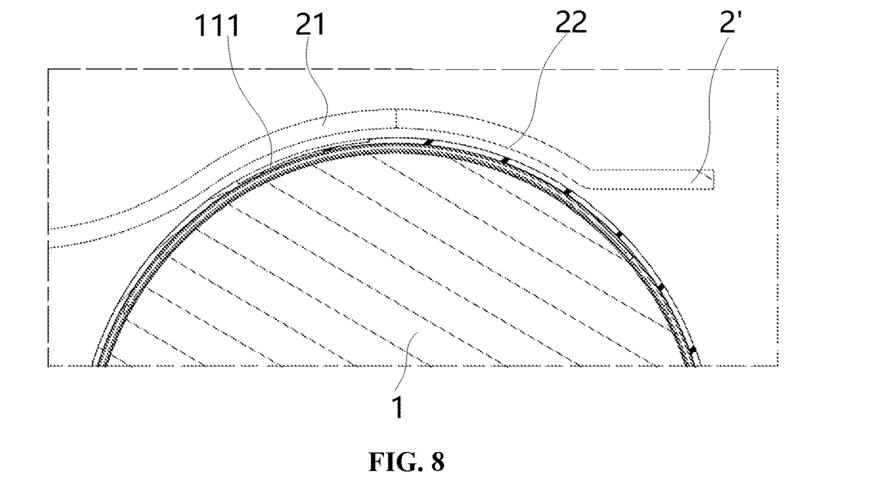
FIG. 8 is a partial cross-sectional view of C-C in FIG. 7.

In some embodiments, as shown in FIGS. 7 and 8, the battery cell 1 is provided with a pressure release mechanism 111, and the pressure release mechanism 111 is configured for pressure release when the internal pressure of the battery cell 1 reaches the first threshold.

For example, the pressure release mechanism 111 may be disposed on the case 11 or the end cover 12.

For example, the pressure release mechanism 111 may be a score disposed on the inner or outer surface of the case 11 or the end cover 12 to reduce a local thickness and facilitate pressure release. As shown in FIG. 8, the pressure release mechanism 111 is disposed on the outer surface of the case 11; or, the region with a lower melting point may also be disposed to form the pressure release mechanism 111.

In the present embodiment, by disposing the pressure release mechanism 111 on the battery cell 1, in the case where the pressure release mechanism 111 is disposed on the end cover 12 or in a region on the case 11 outside the weakened region, when the internal pressure of the battery cell 1 reaches the first threshold, pressure release can be performed through the pressure release mechanism 111 and the region on the case 11 corresponding to the weakened region simultaneously, which can increase the total area of a pressure release channel and increase a pressure release speed. When the pressure release mechanism 111 is disposed in the region on the case 11 corresponding to the weakened region 21, the region on the case 11 corresponding to the weakened region 21 can be broken through more controllably when the internal pressure of the battery cell 1 reaches the first threshold, thereby improving the reliability of pressure release.

In some embodiments, as shown in FIG. 7, the area of the weakened region 21 is greater than an area of the pressure release mechanism 111. In the present embodiment, during thermal runaway of the battery cell 1, a main pressure release function can be achieved through the region on the case 1 corresponding to the weakened region 21, and the pressure release mechanism 111 can play an auxiliary pressure release function.

In some embodiments, as shown in FIG. 7, the pressure release mechanism 111 is disposed on the case 11, and the pressure release mechanism 111 is disposed corresponding to the weakened region 21.

According to the present embodiment, when the internal pressure of the battery cell 1 reaches the first threshold, the region on the case 11 corresponding to the weakened region 21 can be more easily broken through for pressure release, and the pressure-release pressure is more controllable, thereby improving the reliability of pressure release.

In some specific embodiments, as shown in FIGS. 2 to 6, the battery 10 includes a plurality of battery layers 10' and a plurality of limiting members 2, the plurality of battery layers 10' are stacked in the third direction z, each battery layer 10' includes a plurality of cylindrical battery cells 1 disposed side by side in the first direction x, and the gap L is maintained between adjacent battery cells 1. The axis of each battery cell 1 is consistent with the second direction y. The battery cell 1 includes the case 11 and the end cover 12, and the end cover 12 is provided with an electrode terminal 121 and a liquid injection hole 122.

The limiting members 2 are disposed between adjacent battery layers 10' and on the outer side of the outermost battery layer 10', and the plurality of limiting members 2 are all the first limiting members 2'. The limiting member 2 may adopt a wave-shaped plate to form a plurality of recessed portions 22. The plurality of recessed portions 22 and the plurality of battery cells 1 at the layer are disposed in one-to-one correspondence. Each battery layer 2 is limited by two adjacent limiting members 2 to move in the third directions z, and the movement of the battery cell 1 in the first direction x is limited by the recessed portions 22. Each first limiting member 2' is provided with a plurality of weakened regions 21, and each battery cell 1 in the same battery layer 10' is covered by the weakened region 21. The weakened region 21 may be disposed in the middle region of the battery cell 1 in the second direction y. The weakened region 21 may be disposed as a through hole 21', for example, a rectangular through hole 21' is used, and the through hole 21' may cover the cases 11 of at least two battery cells 1 in the first direction x. As shown in FIG. 5, the plurality of battery cells 1 in adjacent battery layers 10' are disposed in a staggered manner in the first direction x, which can reduce the thickness of the battery 10 in the third direction z, and the layout is more compact. The weakened regions 21 on adjacent first limiting members 2' may be disposed in a directly opposite manner in the first direction x, so that after being discharged out of the through hole 21' at the corresponding position, the emissions generated after pressure release of the battery cell 1 in a certain battery layer 10' can directly reach the through hole 21' in the next first limiting member 2' through the gap L in a shorter path, which is beneficial for discharging the emissions out of the battery 10 through the through holes 21' in the plurality of first limiting members 2 in sequence. In some embodiments, the weakened regions 21 on the adjacent first limiting members 2' may also be disposed in a staggered manner in the first direction x.

As shown in FIGS. 7 and 8, the pressure release mechanism 111 is disposed at a position on the case 11 of the battery cell 1 corresponding to the weakened region 21. The pressure release mechanism 111 is configured for pressure release when the internal pressure of the battery cell 1 reaches the first threshold. For example, the pressure release mechanism 111 is adapted to the shape of the weakened region 21, and the area of the pressure release mechanism 111 may be less than the area of the weakened region 21. In some embodiments, the pressure release mechanism 111 may also be disposed on the end cover 12, in a region on the case 11 outside the weakened region 21, or canceled.

For example, the size of the cylindrical battery cell 1 is ⌀34 mm*200 mm, the size of a projection of the weakened region 21 in a plane perpendicular to the third direction z is about 50 mm*50 mm, and the gap L between adjacent battery cells 1 in the same battery layer 10' is 6 mm to 8 mm.

Figure 9:
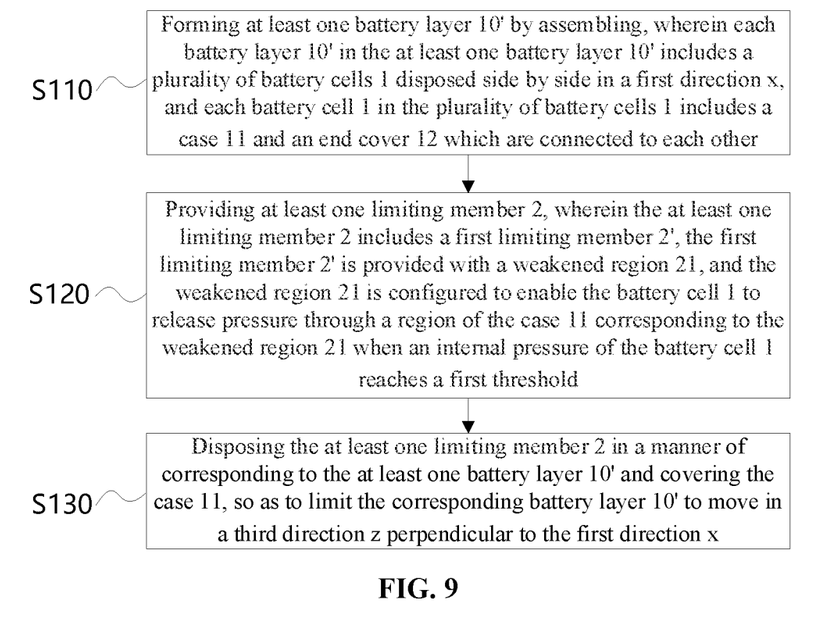
FIG. 9 is a schematic flowchart of some embodiments of a battery manufacturing method according to the present disclosure.

Secondly, the present disclosure provides a battery manufacturing method. In some embodiments, as shown in FIG. 9, the battery manufacturing method includes:

step S110, forming at least one battery layer 10' by assembling, wherein each battery layer 10' in the at least one battery layer 10' includes a plurality of battery cells 1 disposed side by side in a first direction x, and each battery cell 1 in the plurality of battery cells 1 includes a case 11 and an end cover 12 which are connected to each other;

step S120, providing at least one limiting member 2, wherein the at least one limiting member 2 includes a first limiting member 2', the first limiting member 2' is provided with a weakened region 21, and the weakened region 21 is configured to enable the battery cell 1 to release pressure through a region of the case 11 corresponding to the weakened region 21 when an internal pressure of the battery cell 1 reaches a first threshold; and step S130, disposing the at least one limiting member 2 corresponding to the at least one battery layer and covering the case 11, so as to limit the corresponding battery layer 10' to move in a third direction z perpendicular to the first direction x, wherein the third direction z is perpendicular to the at least one battery layer 10'.

The order of execution of steps S110 and S120 is not limited, step S120 may be executed before step S110, and step S130 may be executed after steps S110 and S120.

Figure 10:
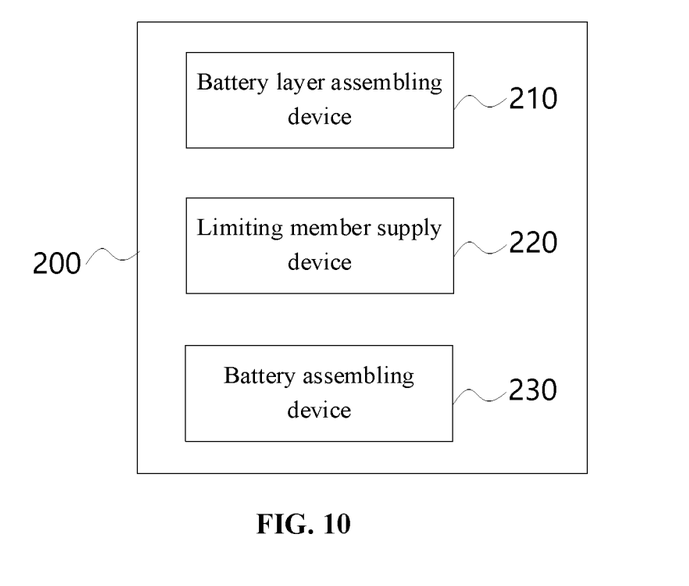
FIG. 10 is a schematic diagram of module composition of some embodiments of a battery manufacturing apparatus according to the present disclosure.

Finally, the present disclosure also provides a battery manufacturing apparatus 200. In some embodiments, as shown in FIG. 10, the battery manufacturing apparatus includes: a battery layer assembling device 210, a limiting member supply device 220 and a battery assembling device 230.

The battery layer assembling device 210 is configured to form at least one battery layer 10' by assembling, wherein each battery layer 10' in the at least one battery layer 10' includes a plurality of battery cells 1 disposed side by side in a first direction x, and each battery cell 1 in the plurality of battery cells 1 includes a case 11 and an end cover 12 which are connected to each other.

The limiting member supply device 220 is configured to supply at least one limiting member 2, wherein the at least one limiting member 2 includes a first limiting member 2', and the first limiting member 2' is provided with a weakened region 21, which enables the battery cell 1 to release pressure through a region of the case 11 corresponding to the weakened region 21 when an internal pressure of the battery cell 1 reaches a first threshold.

The battery assembling device 230 is configured to dispose the at least one limiting member 2 corresponding to the at least one battery layer 10' and covering the case 11, so as to limit the corresponding battery layer 10' to move in a third direction z perpendicular to the first direction x, wherein the third direction z is perpendicular to the at least one battery layer 10'.

According to the above battery manufacturing method and the battery manufacturing apparatus 200, during thermal runaway of the battery 10, a limiting effect of the first limiting member 2' for the case 11 in the weakened region 21 is reduced compared with other regions, the region of the case 11 corresponding to the weakened region 21 is blasted for pressure release at first, and the emissions generated by the pressure release can be discharged out of the battery cell 1 through the region of the case 11 corresponding to the weakened region 21. This manner of realizing the pressure release through the case 11 of the battery cell 1 is beneficial to increase the area of a pressure release region, ensure the stable and smooth discharge of the emissions in the battery cell 1, prevent instantaneous explosion and fire, and improve the safety of the battery 10 during operation.

Although the present disclosure has been described with reference to the preferred embodiments, without departing from the scope of the present disclosure, various improvements can be made and the components therein can be replaced with equivalents. In particular, as long as there are no structural conflicts, various technical features mentioned in various embodiments can be combined in any way. The present disclosure is not limited to the specific embodiments disclosed herein, but includes all technical solutions falling within the scope of Drawings.

What is claimed is:

1. A battery, comprising:
   a box body;
   at least one battery layer, accommodated in the box body, wherein each battery layer in the at least one battery layer comprises a plurality of battery cells disposed side by side in a first direction, and each battery cell in the plurality of battery cells comprises a case and an end cover which are connected to each other; and
   at least one limiting member, disposed corresponding to the at least one battery layer and covering the case, so as to limit the corresponding battery layer to move in a third direction, wherein the third direction is perpendicular to the at least one battery layer, the at least one limiting member comprises a first limiting member, the first limiting member is provided with a weakened region, and the weakened region is configured to enable the battery cell to release pressure through a wall of the case corresponding to the weakened region when an internal pressure of the battery cell reaches a first threshold.

2. The battery according to claim 1, comprising a plurality of battery layers stacked in the third direction, wherein the first limiting member is disposed between every two adjacent battery layers.

3. The battery according to claim 1, wherein the weakened region is configured to form a channel for outward discharge of emissions of the battery cell during pressure release of the battery cell.

4. The battery according to claim 1, wherein the at least one limiting member is the first limiting member, and each first limiting member is provided with the weakened region at a position of each battery cell in the corresponding battery layer.

5. The battery according to claim 1, wherein the first limiting member is provided with a plurality of weakened regions at intervals in the first direction.

6. The battery according to claim 1, wherein the weakened region covers at least two adjacent battery cells in the first direction.

7. The battery according to claim 1, wherein in a second direction, a size of the weakened region is less than a size of the case, wherein the second direction is perpendicular to a plane defined by the first direction and the third direction.

8. The battery according to claim 7, wherein in the second direction, the weakened region is disposed in a middle region of the case.

9. The battery according to claim 1, wherein a projection of the weakened region in a reference plane perpendicular to the third direction is rectangular.

10. The battery according to claim 1, wherein the weakened region comprises at least one of a through hole or a thickness-reduced portion.

11. The battery according to claim 1, wherein there is a gap between adjacent battery cells in the same battery layer, and the gap is in communication with the weakened region.

12. The battery according to claim 1, wherein the battery cell is provided with a pressure release mechanism, and the pressure release mechanism is configured to release pressure when the internal pressure of the battery cell reaches the first threshold.

13. The battery according to claim 12, wherein an area of the weakened region is greater than an area of the pressure release mechanism.

14. The battery according to claim 12, wherein the pressure release mechanism is disposed on the case, and the pressure release mechanism and the weakened region are correspondingly disposed.

15. The battery according to claim 1, wherein the at least one limiting member is made of a metal material.

16. The battery according to claim 15, wherein an insulating film is disposed between each limiting member in the at least one limiting member and the adjacent battery cell to insulate the limiting member from the battery cell.

17. The battery according to claim 1, wherein the battery cell has a cylindrical shape, each limiting member in the at least one limiting member is provided with a recessed portion, and the recessed portion is configured to accommodate the battery cell to limit movement of the battery cell in the first direction and the third direction.

18. A power consumption device, comprising the battery according to claim 1, wherein the battery is configured to provide electrical energy to the power consumption device.

19. A battery manufacturing method, comprising:
   forming at least one battery layer by assembling, wherein each battery layer in the at least one battery layer comprises a plurality of battery cells disposed side by side in a first direction, and each battery cell in the plurality of battery cells comprises a case and an end cover which are connected to each other;
   providing at least one limiting member, wherein the at least one limiting member comprises a first limiting member, the first limiting member is provided with a weakened region, and the weakened region is configured to enable the battery cell to release pressure through a wall of the case corresponding to the weakened region when an internal pressure of the battery cell reaches a first threshold; and
   disposing the at least one limiting member corresponding to the at least one battery layer and covering the case, so as to limit the corresponding battery layer to move in a third direction perpendicular to the first direction, and accommodating them in a box body, wherein the third direction is perpendicular to the at least one battery layer.

20. A battery manufacturing apparatus, comprising:
- a battery layer assembling device, configured to form at least one battery layer by assembling, wherein each battery layer in the at least one battery layer comprises a plurality of battery cells disposed side by side in a first direction, and each battery cell in the plurality of battery cells comprises a case and an end cover which are connected to each other;
- a limiting member supply device, configured to supply at least one limiting member, wherein the at least one limiting member comprises a first limiting member, and the first limiting member is provided with a weakened region, which enables the battery cell to release pressure through a wall of the case corresponding to the weakened region when an internal pressure of the battery cell reaches a first threshold; and
- a battery assembling device, configured to dispose the at least one limiting member corresponding to the at least one battery layer and covering the case, so as to limit the corresponding battery layer to move in a third direction perpendicular to the first direction, and accommodate them in a box body, wherein the third direction is perpendicular to the at least one battery layer.

* * * * *